Jan. 1, 1935.  R. W. EGAN  1,986,189
MULTIPLE BLADED BREAD SLICING MACHINE
Filed July 26, 1932  2 Sheets-Sheet 1

INVENTOR.
RAYMOND W. EGAN
BY
ATTORNEY.

Patented Jan. 1, 1935

1,986,189

UNITED STATES PATENT OFFICE 1,986,189

MULTIPLE BLADED BREAD SLICING MACHINE

Raymond W. Egan, Cincinnati, Ohio

Application July 26, 1932, Serial No. 624,765

1 Claim. (Cl. 146—88)

My invention relates to improvements in a multiple bladed machine for slicing bread, and more particularly to new and useful means suitably timed for automatically feeding the loaves of bread (after they are sliced) from the slicing machine to the conveyor of the conventional bread wrapping machine.

The principal objects of my invention, generally stated, are to provide automatic means for removing the sliced loaves of bread from the slicing machine and deposit them upon the conveyor of the conventional bread wrapping machine in timed relation with said conveyor; to provide means as above described which will readily handle loaves of varying sizes and lengths; and to provide automatic means to turn the loaves from their side position at the cutting station to an upright position prior to being deposited upon the wrapping machine conveyor without danger of disarranging the slices.

Still another object of my invention is to feed the loaves of bread on their sides to the cutting blades to eliminate to a minimum the possibility of the blades carrying the crust crumbs between the slices which is objectionable to the trade and detracts from the appearance of the sliced bread.

Another object of my invention is that in presenting the loaves of bread on their sides to the cutting blades, crushing of the loaves during the slicing period is very materially reduced.

A further object of my invention is to provide a multiple bladed bread slicing machine with mechanisms having these advantages which is very simple and durable in structure and easy to operate.

Other objects pertaining to details and economies of my invention will definitely appear from the detailed description to follow, and the invention is clearly defined and pointed out in the claims.

A bread slicing machine embodying the features of my invention is clearly illustrated in the accompanying drawings forming a part of this application and in which.

Figures 1, 2:
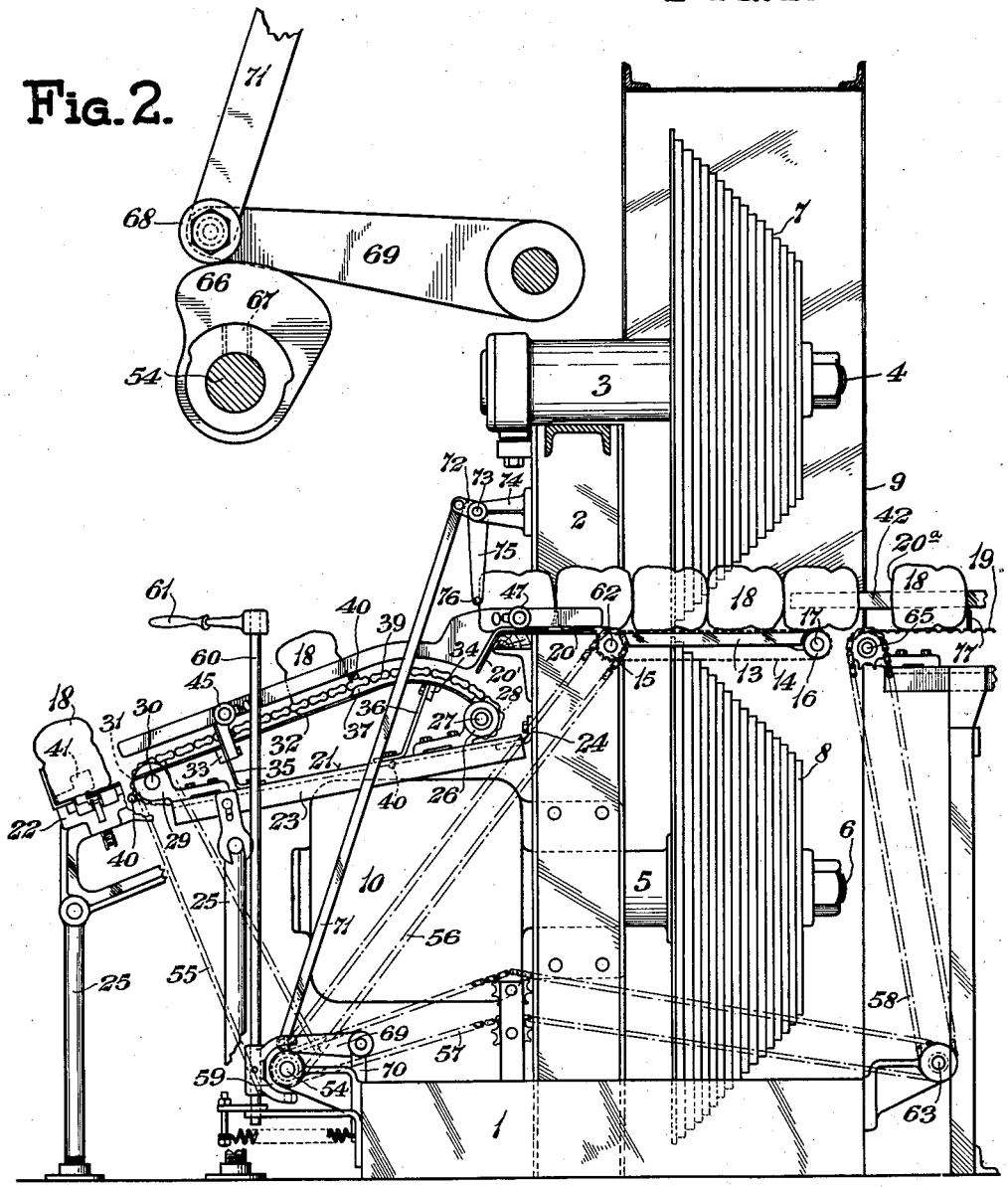
Fig. 1 is a side elevational view partly in vertical section of a multiple bladed bread slicing machine embodying my invention.
Fig. 2 is an enlarged detail view of the stop gate cam and associated parts.

In the embodiment of my invention as illustrated and which shows a preferred construction I provide a multiple bladed bread slicing machine which comprises a base 1, to which is united uprights or frame members 2. This frame work supports upper bearings 3 for the idler shafts 4 and lower bearings 5 for the driven shafts 6. A stepped conical idler wheel 7 is provided for each of the idler shafts 4 and fixed thereto, and a similar stepped conical driven wheel 8 is provided for each of the driven shafts 6 which are likewise fixed for rotation with their respective shafts. A sheet metal housing or casing 9 is fixed to the base 1 and uprights 2 and encloses the stepped wheels 7 and 8, respectively, as shown in Fig. 1.

An electric motor 10 is provided for each of the driven shafts 6, and a plurality of endless blades or cutter bands 11 are trained over each set of the stepped conical idler wheels 7 and stepped conical driven wheels 8.

The endless blades or cutter bands 11 are mounted to operate vertically through slots 12 in table 13, as clearly set forth in my copending application Serial No. 556,184, filed August 10, 1931. A conveyor formed of a plurality of endless chains 14 is driven across the top of table 13 by driving sprockets 15, and 16 represents idler wheels or sprockets for said chains which are supported by a removable shaft 17 (which is also explained in said copending application) to permit insertion of the endless cutter bands between the chains 14 and within the slots 12 in table 13 or removal therefrom.

The loaves of bread 18 are fed to the endless chains 14 by an infeed conveyor 19, partly shown in Fig. 1, and preferably on their sides and with their bottoms 20a foremost, for reasons presently to be described. An outfeed table or plate 20 is supported by the frame members 2 and is in alinement with the upper stretch of conveyor chains 14 and has its forward end 20' bent downwardly, as shown in Fig. 1.

An outfeed conveyor is indicated generally by the numeral 21, and the conventional wrapping machine conveyor is likewise indicated by the numeral 22.

Figure 3:
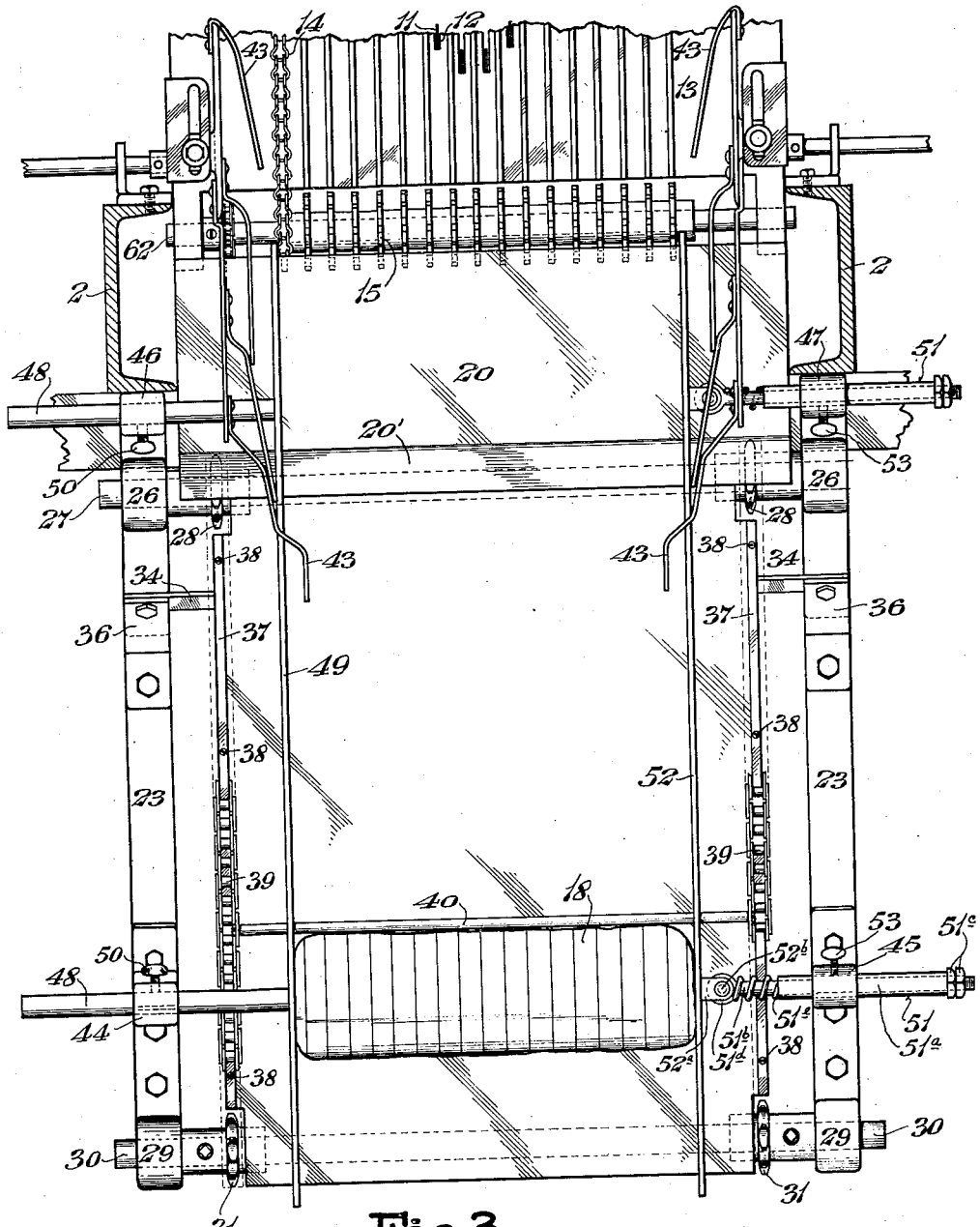
Fig. 3 is an enlarged plan view of a portion of Fig. 1 showing mainly the outfeed conveyor and spring guides over the outfeed table.

Referring in detail to the outfeed conveyor 21, one end of frame work 23 is bolted or otherwise secured to the central uprights 2 at 24 and the other end supported by frame 25 of the wrapping machine conveyor 22. A pair of bearing bosses 26—26 are fixed to the inner end of frame work 23 and shaft 27, journaled therein, carries sprockets 28—28, as best seen in Fig. 3. A similar pair of bearing bosses 29—29 are fixed to the outer end of frame work 23 and shaft 30, journaled therein, carries sprockets 31—31. Curved plate 32 is supported by cross members 33 and 34 which, in turn, are supported by brackets 35—35 and 36—36 mounted upon the frame 23, as shown in Figs. 1 and 3. Chain guide rails 37—37 are secured to the sides of curved plate 32 by suitable means, as, for example, by screws 38. Roller chains 39—39 are trained over sprockets 28 and 31, respectively, and carry spaced apart rods 40 which move the loaves of bread across the curved plate 32 and deposit them one at a time upon the wrapping machine conveyor 22 and between the traveling flights 41 thereof, as will be described under "operation" of the machine.

The loaves 18 are guided upon the infeed conveyor 19 by side guides 42 and as they are moved upon the endless chains 14 they are guided by the spring guides 43—43 which are formed of resilient material to aid in retaining the slices of bread in their original position as they pass over the outfeed table or plate 20.

Brackets 35—35, fixed to outfeed conveyor frame 23, support bearing bosses 44 and 45 and similar bearing bosses 46 and 47 (Fig. 3) are fixed to uprights 2. Bosses 44 and 46 are each drilled to slidably receive guide supporting rods 48 which, in turn, are rigidly fixed to and support side guide plate 49. Wing screws 50—50 are provided for the bosses 44 and 46 to retain the supporting rods 48 in the desired adjusted position.

Bosses 45 and 47 are likewise drilled to slidably receive guide supporting members 51—51 which, in turn, are pivotally attached to and support side guide plate 52. By a study of Fig. 3 it will be noticed that the supporting members 51—51 are different in structure from the supporting rods 48—48. Members 51—51 consist of the tube 51a which telescopically receives a rod 51b threaded at its outer end to receive nuts 51c and provided at its inner end with an eye 51d, which is pivotally attached to ears 52a carried by side guide plate 52 by pin 52b. The tube 51a is shorter in length than the rod 51b and coil spring 51e, encircling said rod, is located between the inner end of said tube and the eye 51d. The tubes 51a are adjustably held within bearing bosses 45 and 47 by wing screws 53—53. Members 51—51, therefore, permit the side guide plate 52 to be movable horizontally to firmly guide loaves of varying lengths.

Drive shaft 54 receives its power from the wrapping machine and is entirely independent of motors 10. Driving chains 55—56—57 and 58 are all driven from shaft 54 and stopped and started by clutch 59 operated by rod 60 and hand lever 61.

Chain 55, trained over suitable sprockets, imparts motion from drive shaft 54 to shaft 30 of outfeed conveyor 21. Chain 56 trained over suitable sprockets transmits motion from drive shaft 54 to shaft 62 carried by table 13 and carries the sprockets 15 which drive the endless chains 14. Chain 57 trained over suitable sprockets transmits power from shaft 54 to idler shaft 63, which latter is journaled in bracket 64 mounted upon base 1, as shown in Fig. 1, and chain 58, trained over suitable sprockets, transmits power from idler shaft 63 to infeed conveyor driving shaft 65.

Stop gate cam 66 is fixed to drive shaft 54 by a pin or set screw 67 and imparts motion to cam roller 68, rotatably mounted upon the free end of arm 69. Arm 69 is pivotally connected to bracket 70 attached to base 1.

The lower end of link 71 is pivotally attached to the free end of arm 69 and the upper end pivotally connected to crank arm 72. Crank arm 72 is fixed to shaft 73, the latter being journaled in brackets 74 attached to uprights 2.

Arms 75, fixed with shaft 73, carry horizontal rod 76, which will be hereinafter referred to as the "stop gate". This gate, as shown in Fig. 1, is located midway of the loaves 18 when in holding position, as will be more fully described.

Referring now to the operation of the machine, and assuming that the drive shaft 54 is in motion and the clutch 59 disengaged, the drive chains 55, 56, 57 and 58 will be at rest and the infeed conveyor 19, endless chains 14 and outfeed conveyor 21 will be stopped.

Then assume that the motors 10 are started to drive the stepped conical driven wheels 8 which, in turn, drive the stepped conical idler wheels 7 through the endless blades or cutter bands 11, the latter traveling vertically through the slots 12 in table 13 and between the chains 14.

With the cutter blades now in motion the hand lever 61 is operated to engage the clutch 59 which connects the drive shaft 54 with the wrapping machine power unit (not shown). When drive shaft 54 is in motion, chains 55, 56, 57 and 58, respectively, are simultaneously driven and, therefore, infeed conveyor 19, chains 14, outfeed conveyor 21 and stop gate 76 are operated in timed relation relative to the movement of flights 41 of the wrapping machine conveyor 22.

Unsliced loaves of bread are then placed upon the infeed conveyor 19 and carried towards the cutting blades 11 by flights 77 fixed to said conveyor and as shown at the extreme right side of Fig. 1. The loaves are guided by the side guides 42 in their travel across the infeed conveyor and deposited upon the endless chains 14 which travel in a direction suitable for feeding the loaves into, through and past the cutting blades 11. As before stated, the loaves are guided through the cutting blades by spring guides 43—43. As shown in Fig. 1, I prefer to present the bottom of the loaves to the cutting blades first, so that the downward travel of the latter does not crush the loaf, and also the top crust of the loaf (which is usually harder and of a dark brown color) will be sliced last and, therefore, the possibility of carrying dark crumbs of the crust between the slices is materially reduced, as against slicing the loaves in an upright position.

As the loaves leave the infeed conveyor each succeeding loaf drives the preceding loaf across the table 13 which aids the endless chains 14 in carrying the loaves through the cutting blades 11. After the loaves of bread pass through the cutting blades on their sides and in a top-to-bottom relation relative to one another they are periodically stopped by stop gate 76 and, therefore, a slight pressure is built up against said gate.

At the proper time gate 76 is moved outwardly by the action of cam 66, roller 68 and link 71 to release the end loaf upon outfeed table or plate 20 and the slight pressure against said end loaf (by the succeeding loaves being driven by chains 14) causes it to move off of table 20, slide down forward end 20′ of said table and come to rest upon the inner end of curved plate 32, the side guide plates 49 and 52 serving to hold the slices of the loaf intact. As the sliced loaves of bread drop by gravity from the table 20 to the curved plate 32 they are automatically caused to change their position from their sides to their bottom, and this is an important step as the sliced loaves must be presented to the wrapping machine conveyor right side up, so to speak. As the sliced loaves 18 are dropped one at a time from the table 20 to the curved plate 32 by the stop gate 76, the spaced apart rods 40 of outfeed conveyor 21 are timed to advance the loaves across said plate and deposit them between the flights 41 of wrapping machine conveyor 22 while the flights are at rest.

From the foregoing description it will be readily apparent that the loaves 18 are fed towards, into and past the cutting blades 11 on their sides then automatically turned on their bottoms or upright and carried towards, and deposited upon wrapping machine conveyor 22.

I have illustrated and described my improvements in an embodiment which has proved highly satisfactory. I have not attempted to illustrate or describe other embodiments or adaptations as I believe the disclosure made will enable those skilled in the art to embody or adapt my improvement as may be desired.

Having thus described my invention, what I claim as new and desire to secure by Letters Patent is:

A bread slicing machine of the type described comprising in combination a base, uprights united with said base, upper and lower bearings secured to said uprights, a driven shaft mounted in each of the lower bearings, an idler shaft mounted in each of the upper bearings, a stepped conical wheel fixed to each of said shafts, a plurality of endless cutters trained over pairs of said stepped wheels, a table supported between certain of said uprights and having slots therein to receive said cutters, a multiple chain conveyor adapted to feed loaves of bread across said table, the chains of which conveyor pass between said cutters, an outfeed table having its outer end bent downwardly, an outfeed conveyor, a stop gate, cam means to operate said gate and spaced apart rods or uprights carried by said outfeed conveyor, characterized in that the stop gate and the downwardly bent end of the outfeed table cause the loaves of bread to change from a side position upon said outfeed table to a bottom position upon said outfeed conveyor, for the purposes specified.

RAYMOND W. EGAN.